1,859,204

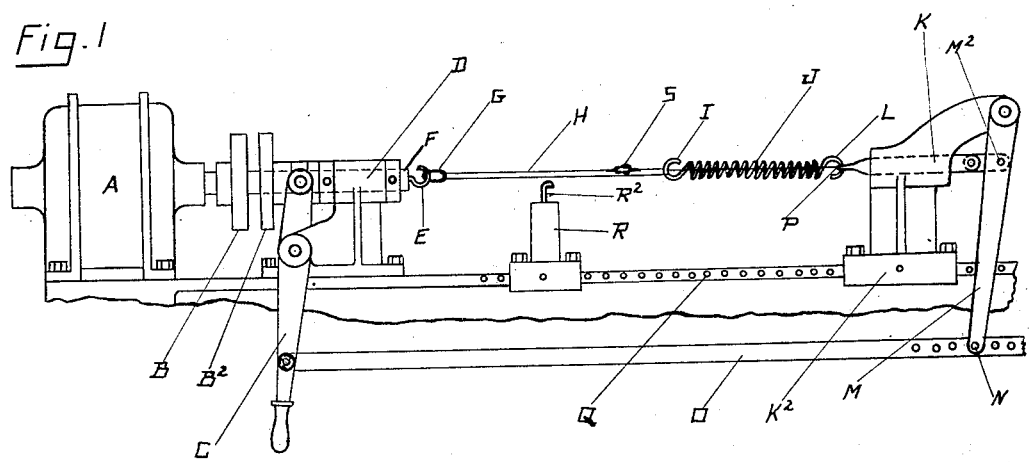
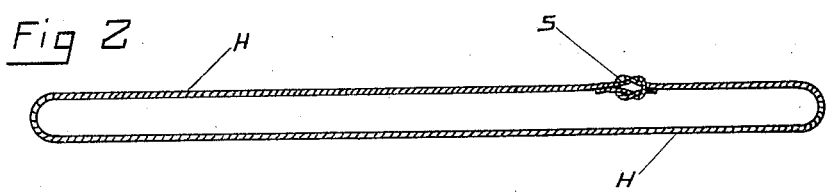
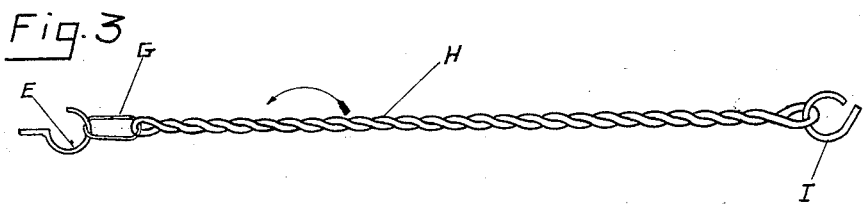
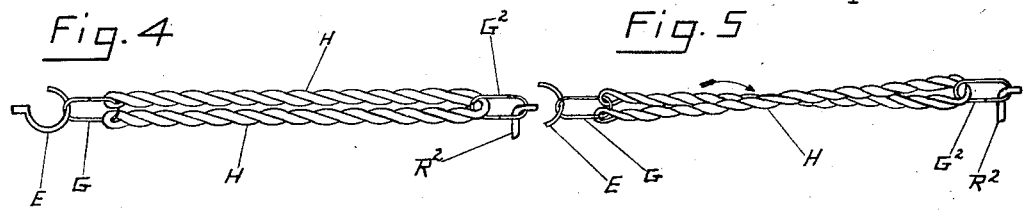
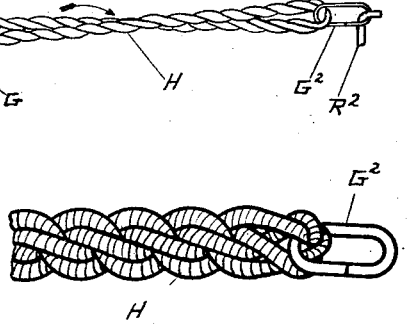
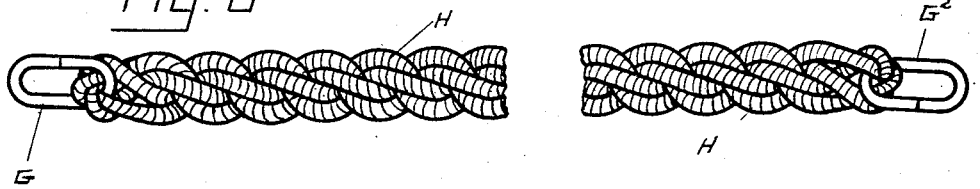
Elmer E. Gray Inventor Patented May 17, 1932

UNITED STATES PATENT OFFICE

ELMER E. GRAY, OF SAUGUS, MASSACHUSETTS

BELT

Application filed March 6, 1930. Serial No. 433,668.

This invention relates to belts such as are used in connecting pulleys for the transmission of power, and to the method of manufacture thereof.

It has for its purpose to provide a belt constructed from a standard commercial material such, for instance, as an ordinary fish line, assembled in such manner and method as to assume what I choose to term a braided effect; to provide a new and novel non-stretching belt; to provide a belt which may be readily shortened or lengthened with minimum effort and operation without adding to or subtracting from the material therein; to provide an improved coupling means built into the body of the belt without puncturing or otherwise weakening the structure thereof; to provide novel means for securing the loose ends of the basic cord, designed to hold said ends fast yet bury the holding means, unseen in the finished belt as a whole; to provide an efficient belt at a cost never before realized in the belt industry; to provide a belt of greater flexibility than heretofore realized; to thereby minimize power requirements; to provide a belt of greater wearing qualities than heretofore realized; to avoid direct pull on the basic material utilized; to render unnecessary binding or covering material; to avoid all stitching and other means of adhesion; to optionally render available the flexibility often required in bringing designated machines to a stop so as to avoid "shock" or "quick stop"; to insure a positive uniformity in the manufactured product so that known requirements may be at all times readily met; to render the method available for use and accomplishment in connection with mechanisms in common use without necessity of furnishing expensive special machinery and equipment; and to provide the various other advantages and results made evident from the following specification.

I accomplish the objects of my invention by tying together the ends of a suitably sized basic material, such for instance as an ordinary fish line, so as to join one continuous, endless loop of the basic material from which the finished belt is to be produced. I mount this endless loop, with the tied portion or knot at approximately one quarter distance from its end upon an inexpensive mechanism designed for twisting purposes, one end of the loop having thereon an eye embodying means designed to interlock later with another similar eye. A motor is then started to provide the twisting effect and an automatic stop provided designed to function when the correct twist is had, the shut off being worked by the pull of the basic material which shortens as the twisting progresses. The end of the basic material, in twisted form, not provided with the interlocking eye, is then disengaged from the twisting mechanism and joined with the eye on the opposite end, the center being doubled over a conveniently arranged standard. Another interlocking eye is then engaged with the center of the loop where it is doubled and the material removed from the twisting mechanism. Whereupon it assumes at its own active volition, furnished by the twisting described, a braided effect particularly adaptable and efficient for belting purposes. I then impregnate the "braided effect" material with a solution, preferably a coal tar product designed to furnish a toughened and adhesive effect. The belt, when dry, is then ready for commercial sale and use. In the performance of its function of transmitting power between pulleys or otherwise, it may be as required for given or changing purposes, shortened by twisting or lengthened by untwisting so that any desired degree of tightness or slackness may be readily and easily had.

The interlocking eyes engaged with the original strands of the basic material provide an efficient and ready means for holding the belt in operating form, yet are readily disengaged for tightening, loosening or mounting purposes. The knot by which the original ends of the basic material were joined becomes absorbed in the twisting process so as to be practically unseen in the finished product and of no hindrance in use.

Avoidance of "shock" and "quick stop" above mentioned is accomplished by utilizing the ready means and method of loosening or tightening the belt to meet specific requirements. The automatic stop referred to insures at all times a uniformity in product when the stop mechanism is set for specific requirement.

The improved method will be well understood from the detailed description herein contained covering a preferred mode of practicing the same and as illustrated in the accompanying drawings. It will be realized, however, that the scope of the invention as defined by the claims hereto appended is not limited to the particular materials or steps which have been chosen for illustrative purposes in this specification, and that while I have illustrated and described a preferred construction for carrying my invention into effect, this is capable of variation or modification without departing from the spirit of the invention. I expressly do not desire to be limited to the exact details of construction herein set forth but desire to avail myself of such variations and modifications as come within the scope of the appended claims.

Referring to the accompanying drawings which form a part of this specification, and in which similar letters of reference refer to similar parts throughout the various views, Figure 1 shows a side view of the mechanism by which the twisting is applied to the basic material. Figure 2 shows a loop of the basic material from which the belt is manufactured with an interlocking eye engraved at one end, an ordinary fishing line or cord being used for this particular illustration. Figure 3 shows the cord and interlocking eye pictured in Figure 2 as positioned on the machine parts with the twisting applied to said cord. Figure 4 shows the twisted material in position after being folded over the hook on the center standard. Figure 5 shows the twisted material as it begins to assume the "braided effect" after loosening its doubled end at the center standard. Figure 6 shows the finished "braided effect" belt, having no semblance of a twisted product.

Referring again to the drawings, A shows the motor, B and B² show the face parts of the friction clutch, C shows the shift lever by which the friction clutch is operated. D shows the shaft bearing. E shows a hook on the end of the shaft F over which hook the coupling eye G on the cord H is placed. I shows a hook on the spring J which spring is secured to the member K by the hook L. The member K is mounted at its end opposite the hook L to a leverage arm M fulcrumed at M² which arm in turn is adjustably connected by the pin N to the plunger rod O, the opposite end of which is connected to the shaft lever C. A loose cord P is positioned within the spring J secured at both ends thereof so as to become taut only when the spring J is in extended position, and designed then to operate the leverage arm M. Q shows the bed of the machine. R shows the center standard movably mounted on the bed Q to allow shifting to the varying center point of the different length cords used. R² shows a hook mounted on the standard R. S shows the knot by which the ends of the cord H are tied together. The part K² is movably mounted upon the bed Q so as to care for cords of varying length.

It will be understood that after the cord H is mounted upon the machine as shown in Figure 1, the twisting is applied to the cord by starting the motor and closing the clutch, this closing being effected by moving the lever C in direction away from the motor so that the friction plates B and B² on the clutch contact. As the twisting progresses, the basic material or cord shortens, the spring J stretches a corresponding distance, and the cord P tightens, whereupon the arm M is pulled in a direction toward the motor which by virtue of the rod O forces the lever C into similar position and disengages the clutch. The twisting then stops. The end of the basic material at the hook I is next disengaged, and the strands thereof placed upon the coupling eye G, this being readily accomplished by meanwhile doubling the material H over the hook R² on the center standard R. An eye G² is then engaged with the strands of the material H at the point where it doubles upon the hook R². The belt is then released and allowed to assume its braided relation as stated.

Having thus described my invention, I claim as new and desire to secure by Letters Patent of the United States of America:—

1. The method of making a belt which includes engaging an eye having means of engaging a similar eye, with a strand of twisted basic material, assembling said material in loop form with the engaged eye thereon, the eye being at one end thereof, upon a mechanism designed to twist said material, twisting said material thereon, doubling said material at its center and engaging its end opposite said eye with the eye, engaging another similar eye with said material at its doubled portion, and retwisting the material till it forms a braided effect.

2. The method of making a belt which includes engaging an eye having means for engaging a similar eye, with a strand of twisted basic material, assembling said material in loop form with the engaged eye thereon, the eye being at one end thereof, upon a mechanism designed to twist said material, twisting said material thereon, doubling said material at its center and engaging its end opposite said eye with the eye, engaging another similar eye with said material at its doubled portion, retwisting the material till it forms a braided effect, impregnating the braided effect material with a solution designed to furnish a toughened and adhesive effect, and allowing same to dry.

3. The method of making a belt which includes engaging an eye having means of engaging a similar eye, with a strand of basic material, assembling said material in loop form with the engaged eye thereon, the eye being at one end thereof, upon a mechanism designed to twist said material, twisting said material thereon, doubling said material at its center and engaging its end opposite said eye with the eye, engaging another similar eye with said material at its doubled portion, retwisting the material till it forms a braided effect, impregnating the braided effect material with a solution designed to furnish a toughened and adhesive effect, and allowing same to dry.

4. The method of making a belt which includes making a loop of a basic twisted material by securing together the ends thereof, engaging with said material an eye, having means of engaging a similar eye, assembling said loop and engaged eye, the eye being at one end thereof, upon a mechanism adaptable for twisting said loop, the portion of said loop at which the ends are joined being positioned between its center and one end thereof, twisting said loop, doubling the twisted loop upon itself, engaging a strand of the end without an eye on to the first mentioned eye, engaging a similar eye with the strands of the twisted loop at its double end and allowing the twisted loop to retwist to a braided effect, impregnating the material with a solution designed to furnish a toughened and adhesive effect and allowing same to dry.

5. The method of making a belt which includes making a loop of a basic material by securing together the ends thereof, engaging with said material an eye, having means of engaging a similar eye, assembling said loop and engaged eye, the eye being at one end thereof, upon a mechanism adaptable for twisting said loop, the portion of said loop at which the ends are joined being positioned between its center and one end thereof, twisting said loop, doubling the twisted loop upon itself, engaging a strand of the end without an eye on to the first mentioned eye, engaging a similar eye with the strands of the twisted loop at its double end and allowing the twisted loop to retwist to a braided effect, impregnating the material with a solution designed to furnish a toughened and adhesive effect and allowing same to dry.

In testimony whereof I affix my signature.

ELMER E. GRAY.